United States Patent [19]

Nied

[11] Patent Number: 4,472,620

[45] Date of Patent: Sep. 18, 1984

[54] INSTRUMENTED SPOT WELDING ELECTRODE

[75] Inventor: Herman A. Nied, Ballston Lake, N.Y.

[73] Assignee: General Electric Company, Schenectady, N.Y.

[21] Appl. No.: 481,171

[22] Filed: Apr. 1, 1983

[51] Int. Cl.³ .............................................. B23K 11/30
[52] U.S. Cl. .................................... 219/120; 219/109; 219/110
[58] Field of Search ................. 219/109, 110, 119, 120

[56] References Cited

U.S. PATENT DOCUMENTS

| | | | |
|---|---|---|---|
| 2,104,749 | 1/1938 | Jones | 219/110 |
| 2,200,887 | 5/1940 | Lockwood | 219/119 |
| 2,317,681 | 4/1943 | Fletcher | 219/120 |
| 2,354,190 | 7/1944 | Benkert | 219/120 |
| 2,363,536 | 11/1944 | Leathers | 219/120 |
| 2,370,009 | 2/1945 | Clark et al. | 219/110 |
| 2,433,963 | 1/1948 | Tarbox et al. | 219/109 |
| 3,335,258 | 8/1967 | Barnhart et al. | 219/110 |

Primary Examiner—C. C. Shaw
Attorney, Agent, or Firm—Donald R. Campbell; James C. Davis, Jr.; Paul R. Webb, II

[57] ABSTRACT

An instrumented spot welding electrode significantly improves the weld quality available from production resistance spot welding machines by providing real time measurements of key multivariable resistance welding parameters. The real time data provided may be used as inputs to adaptively control welding machines and dynamically adjust welding system operation responsive to the sensed variables. A number of sensors are positioned within a cavity specially formed into a water cooled electrode tip to obtain the desired measurements while being protected against physical damage. The sensors are advantageously placed in good thermal and electrical contact with a plug element which bears directly on the workpieces being welded to enhance the accuracy of the sensed variables. This specially configured and instrumented sensor cavity is ideally suited for use with all end types of electrodes including spherical, truncated, offset, flat and the like.

8 Claims, 5 Drawing Figures

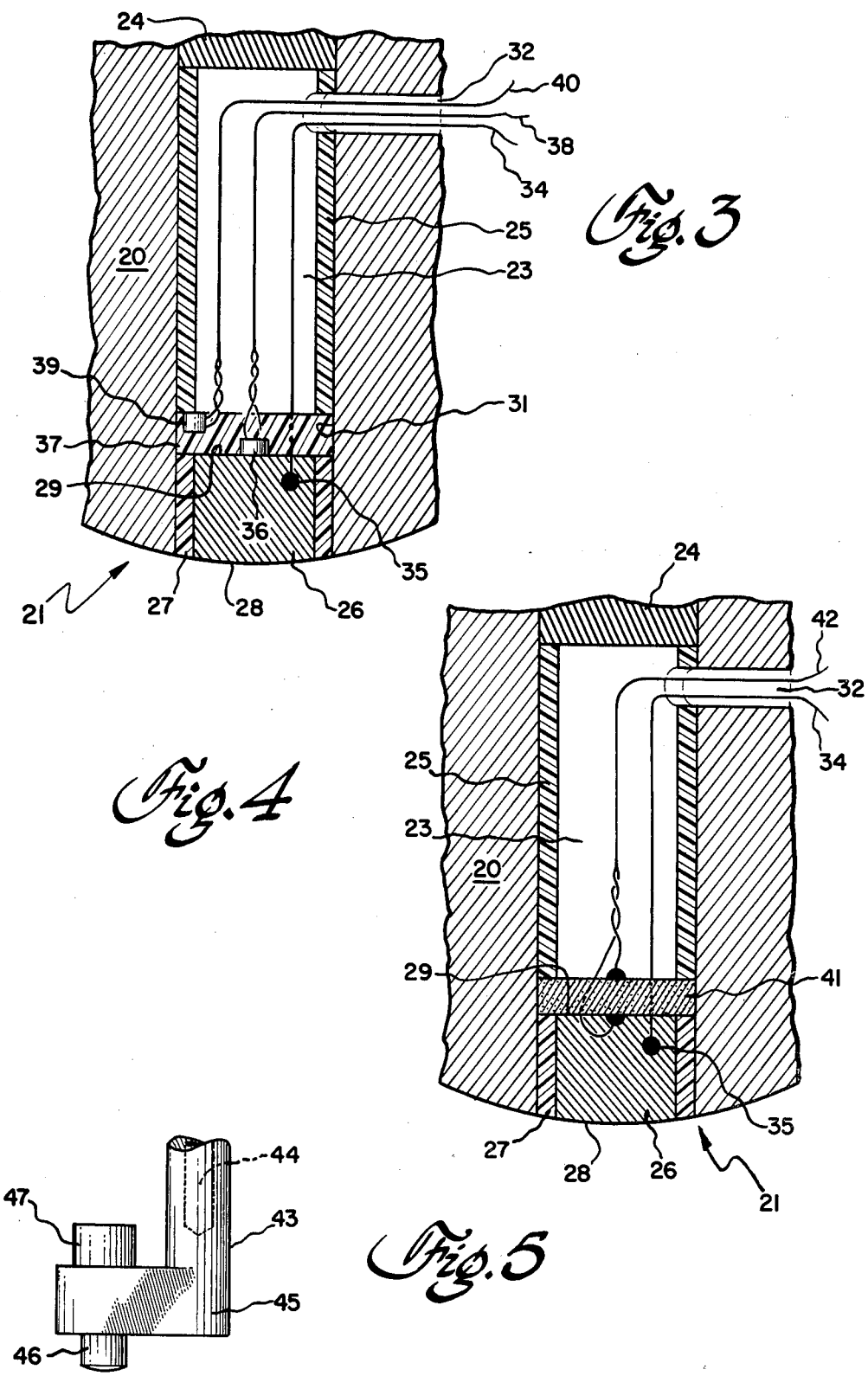

INSTRUMENTED SPOT WELDING ELECTRODE

BACKGROUND OF THE INVENTION

The present invention relates to an instrumented electrode for providing multivariable data measurements for use in resistance spot welding machines. More specifically this invention concerns an instrumented electrode having a plurality of sensors positioned relative to the electrode end to simultaneously obtain forcing function variables such as welding voltage, current, and mechanical load, as well as response variables such as workpiece surface temperature and displacement due to thermal expansion.

A fairly wide range of instrumentation for resistance spot welding electrodes has been implemented in a variety of prior art approaches, each of which is directed to determining or monitoring primarily only one of the welding parameters considered to be of importance. For example, it is known to provide an instrumented electrode assembly for measuring the voltage drop across a pair of workpieces being joined during resistance welding. In a known arrangement, an insulated wire member is inserted into the interior of an electrode as an electrical attachment to the tip of that electrode for connection to a conventional external voltmeter measuring circuit. Voltage sensing techniques using wires attached to the tips of the pair of electrodes have been used.

The known arrangements are ill suited to meet the ever increasing requirements for higher quality resistance welding devices. No prior art approaches to instrumented welding electrodes have successfully addressed the combination of parameter measurements required to produce a consistently good weld. In particular, with respect to the three groups of welding variables, (1) forcing functions such as voltage, current and mechanical load; (2) response variables such as workpiece surface temperature and electrode displacement due to thermal expansion; and (3) the independent variable time, the prior art is almost totally silent on the need for simultaneously providing the multivariable data required.

The multivariable instrumented spot welding electrode of the present invention addresses these particular needs, and provides a highly advantageous improvement to the art of resistance spot welding sensing and controlling.

SUMMARY OF THE INVENTION

It is therefore a primary object of the present invention to provide an improved instrumented electrode for obtaining real time welding parameters such as workpiece surface temperature, electrode load, and voltage.

Another object of the present invention is to provide an instrumented electrode which will provide accurate and instantaneous measurements of the key variables required for use in a resistance spot welding microprocessor-based adaptive control system.

A further object of the present invention is to provide an instrumented electrode for use with a spot welder control system to improve the quality of spot welds by providing a real time measurement of multiple weld system variables.

A still further object of the present invention is to provide an instrumented electrode for developing real time measurements of key resistance welding parameters using one or more sensors suitably positioned in or on the electrode end, the key parameters including workpiece surface temperature, voltage, and current, as well as electrode load and thermal displacement.

The present invention provides accurate and instantaneous measurements of dominant workpiece variables to enable associated spot welding controllers to produce consistently good weld quality in a production environment, and to eliminate the possibility of poor welds being produced without alerting production personnel.

In an illustrative embodiment, a number of sensing means are positioned in a cavity formed into the tip of an electrode so as to assure good thermal and electrical contact between the sensors and the workpiece surface. To this end a high thermal diffusivity, low electrical resistivity plug member is fitted into a central longitudinal channel at the end face of the electrode. Both welding forcing function data and welding response data are thereby obtained. The output signals from the various sensors are routed to external circuitry for use in providing real time adaptive control of automatic production welding machines. In a preferred embodiment, solid state sensors and combinations of thermocouples, Hall effect sensors, resistance strain gages and piezoelectric transducers are used to accomplish the desired parameter sensing.

BREIF DESCRIPTION OF THE DRAWINGS

Additional objects and advantages of the invention will become apparent to those skilled in the art as the description proceeds with reference to the accompanying drawings wherein:

FIG. 3 shows a portion of the electrode of FIG. 2 in greater detail;

FIG. 4 shows an alternate embodiment of the tip of the electrode of FIG. 2, also in greater detail; and FIG. 5 depicts an instrumented offset electrode having sensors exterior as well as interior to the electrode.

DETAILED DESCRIPTION OF THE PREFERRED EMBODIMENTS

The basic phenomena of resistance spot welding are fairly well known despite the fact that the process is a complicated physical, mechanical, and metallurgical one. By the way of a brief overview, reference is made to FIG. 1 which is a sketch of a basic resistance spot welding system 10. The system 10 is used to implement the process of joining two materials due to localized metallic fusion across their interface as applied via a pair of low electrical resistance electrodes 11 and 12. The electrodes 11 and 12, which carry a high current to a localized area of metallic workpieces 13 and 14, exert a concentrated force on the outer surfaces of the materials to be joined. This electrode pressure "P" produces a local deformation at the interface of the metals to be joined and indents the outer surfaces due to the highly concentrated compressive stresses. The purpose of the initial electrode load is to properly seat the workpieces and to maintain good electrical contact. The electrical resistance of the system, composed of the copper electrodes and the two metal sheets to be joined, consists of the material resistances of the copper and the workpieces, plus the surface contact resistances at each material interface. The surface contact resistance is due to surface films, oxides, and asperities at each interface. A high electrode force, producing a localized compressive interface stress, will break down the asperity of the surface, thereby providing good contact which will result in reduced surface electrical and thermal resistance. Since the resistance of the copper electrodes and metals to be joined is small, a large current discharge is needed to produce the Joule heating effect. The voltage drop and Joule heating effects are largest in the workpieces since the resistivity of the copper electrodes is an order of magnitude less than most materials to be joined.

Some localized heating does occur at the electrode and workpiece interface, but this is small compared to the interior heating of the workpieces. The heat generated by the Joule effect produces an interior temperature increase which is proportional to the time of the current discharge. When the time is sufficiently large, the melting temperature is obtained which produces an expanding molten metal zone emanating from the workpiece interface. This phase change from solid to liquid creates a large thermal expansion and the molten liquid must be contained by the electrode forces exerted. The cool down process occurs next forming the spot weld nugget 15 from the molten zone, thereby joining the two workpieces together.

Figure 1:
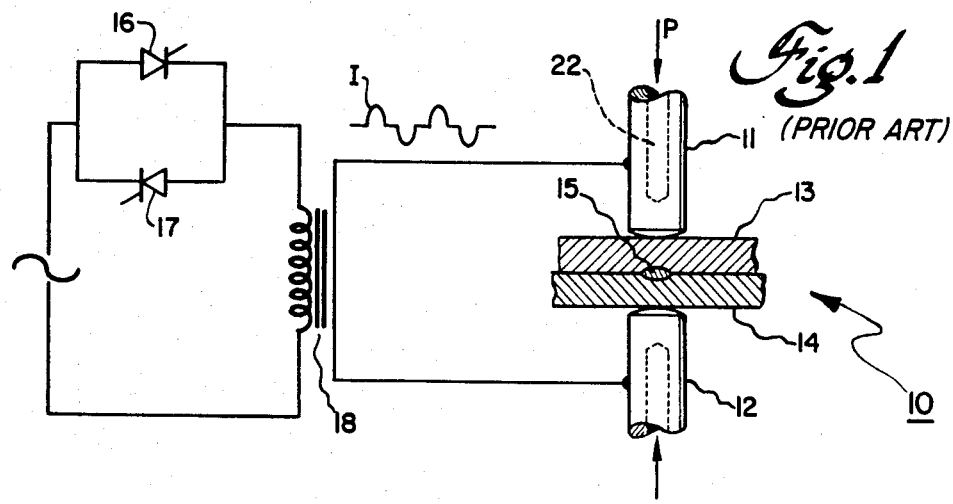
FIG. 1 is a schematic of a basic resistance spot welding system.

The electrodes 11 and 12 of FIG. 1 are shown as being of the water cooled, spherical end type. However, the present invention is equally applicable to truncated end, flat end, offset, and other electrode end geometries. Two channels 22 disposed longitudinally within the electrodes route a supply of cooling water to carry heat away from the electrode tips.

An illustrative single phase electrical circuit for energizing the electrodes is comprised of a pair of inverse-parallel silicon controlled rectifiers (SCRs) 16 and 17 in series with the primary winding of a welding transformer 18. The SCRs' are phase controlled and naturally commutated (by means not shown) and control the number and magnitude of the AC welding current pulses supplied to the electrodes. Other well known means for energizing resistance spot welding systems include the use of three-phase AC power sources, and AC/DC conversion circuits which apply DC current pulses to the electrode. A typical three phase power circuit would include a three phase-to-three phase transformer in lieu of transformer 18 shown, with a secondary circuit supplying current to the low voltage rectifiers which in turn would deliver high current, low voltage power pulses to the electrodes 11 and 12.

In an adaptive controller of the type capable of using the multivariable sensor data developed by an instrumented spot welding electrode according to the present invention, a real time resistance spot welding machine automatically controls the formation of spot welds, while diagnosing the quality of each weld as it is formed, and performs online machine diagnostics before, during and after each weld. The adaptive controller receives the various sensor inputs developed simultaneously from the electrode and processes these inputs via a central electronic control system including specialized interfaces, peripherals and controls that assure the desired weld quality. One is described in commonly assigned copending application Ser. No. 386,153 filed July 7, now U.S. Pat. No. 4,447,700, R. K. Cohen, "Resistance Spot Welder Adaptive Control." The instrumented electrode is particularly for use in conjunction with a single chip microprocessor system for controlled feedback.

Welding system variables sensed by the instrumented electrode and appropriate instrumentation illustratively include: workpiece surface temperature (measured by thermocouples or diodes mounted within the electrode cavity); voltage (measured from electrode to electrode by contact shoes); current (measured by a Hall effect sensor mounted within the electrode); electrode load (measured via a piezoelectric load cell or resistance strain gage built into the electrode tip); displacement (measured by a piezoelectric accelerometer in the tip in conjunction with external integration circuits that do a double integration to get thermal displacement); weld penetration (measured by an ultrasonic piezoelectric transducer in a cavity in the tip); and if necessary the electromagnetic interference pattern produced by the welding system. It is not essential that all of the foregoing is inside the electrode; some of the instrumentation can be mounted exterior to the electrode as for instance in FIG. 5.

Figure 2:
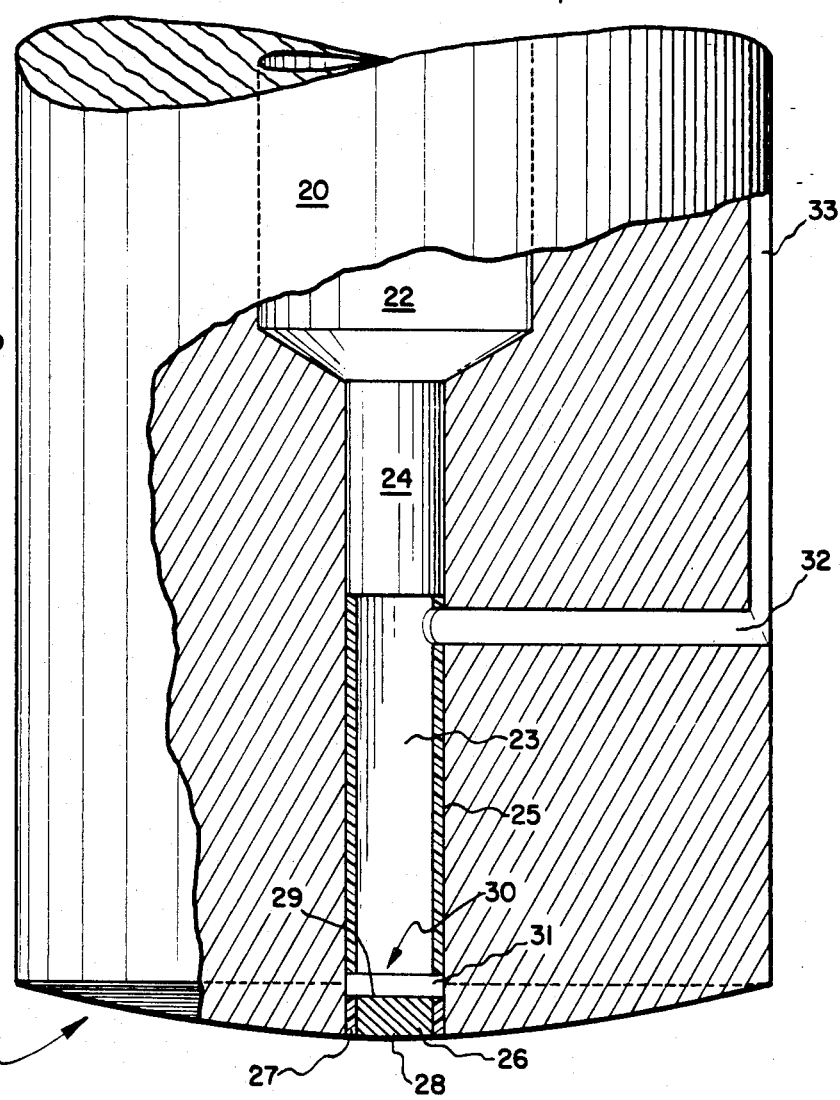
FIG. 2 shows an instrumented electrode having multivariable sensing capability.

Referring to FIG. 2 there is shown an instrumented electrode having multivariable sensing capability according to the present invention. The water cooled electrode body 20 is shown illustratively as being of the spherical end type, i.e. having a spherical tip or end shown generally at 21, and as having a longitudinally disposed water cooling channel 22 positioned therein. A narrow diameter channel 23 is machined from the end face to cooling channel 22 along the longitudinal center line of the body 20, and is stopped off or plugged at the water cooling end by a solid sealing plug 24. Beyond the plug 24, the wall of channel 23 is lined with a hollow electrical insulative layer or sleeve 25 which extends up to but not into the electrode contact region adjacent the tip 21. Sleeve 25 may simply be an insulative tubing or in the alternative a deposited coating. At the contact end 21 of the electrode, a contact plug 26 is inserted which is thermally and electrically insulated from the electrode body 20 by an insulating retaining ring 27. The contact plug 26 may advantageously be fabricated from silver, which has a high thermal diffusivity and low electrical resistivity, and thus provides an ideal contact transfer medium for measuring temperature and voltage close to the surface of the workpiece. The lower end or contact face 28 of the plug is shaped according to the type of electrode to provide a continuous surface. In the illustrative embodiment, the contact face is spherical. The upper or back face 29 of plug 26 provides a planar mounting surface. One or more sensors 30 in a stacked arrangement as detailed below are positioned contiguous to the back face 29 of the contact plug 26, or are mounted at or in the lower portion of the channel 23 with their sensing ends proximate to the plug 26. Thus, the lower portion of the channel 23 serves as a sensor chamber. In the preferred embodiment insulator 25 terminates short of the plug 26 to form a chamber 31 therebetween which may receive a substrate or element on which the sensors are mounted.

Sensor output signals are routed through a number of leads not shown) via the sensor channel 23, and thence via a radial intersecting channel 32. An axial groove 33 along the peripheral surface of the electrode body 20 is provided in which the leads are positioned to maintain the leads clear of the weld operation and to carry the leads away for interconnection with external monitoring circuits. Although only single leads are shown, it should be readily apparent that each may actually be a group of leads or cable. The wire runs can be filled such that the electrode unit would be hermetically sealed.

The contact plug 26, insulating ring 27, sensors 30, and insulating sleeve 25 are sized and configured to provide a somewhat yielding column such that the bulk of the compressive stress during a spot weld is carried by the remainder of the electrode end surface. Thus, the sensors 30 are positioned to make intimate contact with the workpiece surface, but are protected from the full high compressive forces extant in the electrode body.

The embodiment described is particularly applicable to the sensing of voltage and temperature at the workpiece surfaces. In these instances it is necessary that the plug 26 make good thermal and electrical contact with the workpiece surface to assure accurate measurements of the two parameters. Analyses of the pressure distributions for various types of electrode end faces have shown that characteristic stress patterns are associated with each type of end face. These pressure distributions are generally symmetrical around a longitudinal electrode axis, but vary greatly in the radial direction.

For a spherical end face electrode as shown, it is known that maximum stress exists at the electrode center, colinear with the longitudinal axis. Therefore, attention must be given to the design of the components 23-31 such that the sensors make adequate contact with the workpiece surface while being protected from the destructively high compressive forces typically experienced at the electrode end faces.

For a truncated end face electrode type, it has been determined by the inventor that maximum pressure is present at the periphery of the circular contact face at the end of the electrode, i.e., at the "corner" of the truncated end. Consequently, this type of electrode represents a slightly more benign stress environment, but still requires consideration of the structural interactions between components 23-31. Flat end face electrodes present approximately the same structural/interaction considerations as the truncated electrode.

The high thermal diffusivity of plug 26 in combination with the good thermal insulating action of ring 27 assures that the temperature experienced at the plug is largely due to the heat transfer from the workpiece. In this regard it is necessary that the electrode body be water cooled to assure that it is the workpiece heat which is being sensed and not a contaminating effect resulting from electrode body heat flow.

Referring now to FIG. 3, there is shown an enlarged, fragmented view of the electrode and face region (not strictly to scale) to include greater detail of the various sensing means and their positioning within the chamber 23. An electrical conductor 34 is electrically connected to an attachment point 35 on the external surface of the plug 26 or internally thereof. The conductor 34 which may be a conventional insulation coated flexible copper wire, is routed externally through the interior of channel 23 and through the radial channel 32 to interconnect with external measuring and monitoring circuitry. The plug 26 and conductor 34 in combination with corresponding elements on an oppositely disposed electrode (not shown) provide the means by which the voltage across a pair of workpieces being joined or voltage gradient therein may be measured, the plug 26 serving as a contact element. When used in combination with other elements to simultaneously sense various welding parameters, this voltage data enables the implementation of real time welding monitoring and control capability as previously described.

The temperature of the workpiece surface, a second key welding parameter, is obtained via a thermocouple 36 disposed within chamber 31 formed in a sensor retaining block or substrate 37. The thermocouple 36 is urged into firm thermal contact with the interior planar surface 29 of plug 26. The interface between the two may be layered, if desired, with a thermally conductive substance. A pair of interconnecting leads 38 carry the desired temperature data externally through the radial channel 32 to external measuring and monitoring circuits. The present invention contemplates the use of alternate types of temperature sensors.

Welding currents flowing in the electrode body during a resistance weld are typically in the range of several thousand amperes and are thus not readily measured directly. A Hall effect sensing device 39 on substrate 37 is used to carry out this measurement by sensing the magnetic field produced by the weld current. For this purpose, the sensor 39 is mounted in an off-axis position with respect to sensor 36 and its output is routed via a pair of leads 40 through the radial channel 32 to external measuring and monitoring circuits. The off-axis location of sensor 39 increases the sensitivity of the sensing device by introducing an axial displacement from the central longitudinal axis, where the current-induced magnetic field is at a minimum. In a preferred embodiment, the sensor 39 may be fabricated from indium arsenide, or other high Hall sensitivity materials having small temperature coefficients, including materials of the thin film types.

It is worthy of note that the three key welding parameters measured via the embodiment of FIG. 3 are all available in real time on a per weld basis, and therefore may be considered to be available substantially simultaneously.

Referring to FIG. 4, there is shown a modified version of the electrode end face region to depict details of alternate sensor types which may be used either singly or in combination with those already discussed. A disc-shaped piezoelectric transducer 41 is shown retained between the insulating ring 27 and the sleeve-like electrical insulator 25. In this configuration, it is essential that the compressive forces experienced by the electrode end face be transmitted in some known ratio to the transducer 41. Thus, the physical properties of the sleeve component 25 and ring 27 which retain the transducer 41 must be considered as part of the measuring circuit. This consideration is distinct from the considerations relative to the embodiment of FIG. 3 wherein sleeve element 25 and ring 27 function only as insulating elements. The output from transducer 41 is carried via a pair of interconnecting leads 42 through the radial channel 32 to external measuring and monitoring circuits. Transducer 41 may be of the quartz disc type, or of other known piezoelectric or piezoresistive materials including barium titanate and Rochelle salts.

To retain the plurality of interconnecting leads in position during repeated actuations of the electrode, it may be desirable to introduce various types of sealing and retaining compounds into the cavity 23. Additionally, other embodiments may require the entire cavity 23 to be filled so as to provide a completely hermetically sealed electrode for use in particular environments.

Another embodiment in FIG. 5 is an instrumented electrode which has instrumentation mounted exterior as well interior to the electrode. This offset electrode has a copper shank 43 with a water cooling channel 44, a transverse copper bar 45, and an instrumented tip 46 of the spherical end type which can be identical to that shown in FIG. 2 or FIG. 3, from the bottom of sealing plug 24 on down. Current flow is through the shank and bar body members to the tip. Some of the instrumentation, such as an accelerometer and a Hall effect device, are inside a can 47 on top of bar 45, and there is a vertical, insulation lined hole in the bar lined up with sensor channel 23 through which wires and cables are run.

In conclusion, the success of a microprocessor based spot welder adaptive control system is dependent on sensing variables in the vicinity of workpieces to be joined. This instrumented electrode can be used for multiple variable sensing and is the sensing instrument.

Although the invention has been described in terms of selected preferred embodiments and variations thereof, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. An instrumented resistance spot welding electrode comprising:
   (a) a body member terminating in an end face, said body member having a central elongated longitudinal channel extending along its axis and through the end face;
   (b) a high thermal diffusivity, low electrical resistivity plug member fitted into said channel at said end face location;
   (c) means for thermally and electrically insulating said plug member from the inner walls of said channel; and
   (d) at least two sensing means disposed in said channel and in contact with an interior portion of said plug for simultaneously sensing at least two predetermined resistance welding variables, wherein at least one of said sensing means comprises a piezoelectric device in pressure bearing relationship with said plug within said channel for providing pressure data indicative of the compression load applied by said electrode on a workpiece in contact with said end face during a weld operation.

2. An instrumented resistance spot welding electrode comprising:
   (a) a body member terminating in an end face, said body member having a central elongated longitudinal channel extending along its axis and through the end face;
   (b) a high thermal diffusivity, low electrical resistivity plug member fitted into said channel at said end face location;
   (c) means for thermally and electrically insulating said plug member from the inner walls of said channel; and
   (d) at least two sensing means disposed in said channel and in contact with an interior portion of said plug for simultaneously sensing at least two predetermined resistance welding variables, wherein at least one of said sensing means comprises a piezoresistive device in pressure bearing relationship with said plug within said channel for providing pressure data indicative of the compression load applied by said electrode on a workpiece in contact with said end face during a weld operation.

3. A multivariable resistance spot welding electrode of the water cooled type comprising:
   (a) a copper-based body member terminating in an end face and having a central elongated longitudinal channel extending along its axis and through the end face;
   (b) a high thermal diffusivity, low electrical resistance plug member fitted into said channel at said end face location and thermally and electrically insulated from the inner walls of the channel by an insulating member;
   (c) a plurality of sensing means in said channel and in contact with an interior portion of said plug member for simultaneously monitoring at least two predetermined resistance welding variables, said sensing means comprising:
      (i) a first sensor including an electrical conductor in electrical contact with said plug for providing a means of deriving data indicative of the voltage gradient in a workpiece in contact with said plug exterior surface during a weld operation;
      (ii) a thermocouple device placed in contact with an interior surface of said plug for providing temperature data indicative of the surface temperature of a workpiece in contact with an exterior surface portion of said plug during a weld operation;
      (iii) a piezoelectric device in pressure bearing relationship with said plug within said channel for providing pressure data indicative of the compression load applied by said electrode on a workpiece in contact with said end face during a weld operation; and
      (iv) a Hall effect device in said channel for providing magnetic field strength data indicative of the current flow through said electrode during a resistance welding operation.

4. The instrumented electrode of claim 3 wherein said electrode further comprises conductors connected to said sensing means and a radial channel connecting said longitudinal channel with the exterior of said electrode body for routing said conductors externally of said electrode.

5. An instrumented multivariable resistance spot welding electrode comprising:
   (a) a copper-based body member having chambers for water cooling, an end face, and a central elongated longitudinal channel extending along its axis and through said end face;
   (b) a high thermal diffusivity, low electrical resistivity plug member of silver-based material fitted into said channel and means for thermally and electrically insulating said plug member from the inner walls of said channel, said plug member having a first surface wholly interior to said channel, a second surface insulated from the inner walls of said channel, and a third surface forming an exterior surface portion of said end face and conforming to the shape of said end face; and
   (c) a plurality of sensing means disposed in said channel and in contact with an interior portion of said plug member for simultaneously sensing resistance welding variables, said sensing means comprising:
      (i) a first sensor including an electrical conductor in contact with said plug and providing a means for deriving data indicative of the voltage gradient in a workpiece in contact with said exterior surface portion of said plug during a resistance weld operation; and (ii) a second sensor comprising at least one thermocouple device in contact with said plug interior surface for providing temperature data indicative of the surface temperature of the workpiece.

6. The instrumented electrode of claim 5 wherein said sensing means further comprises a piezoelectric device in pressure bearing relationship with said second surface of said plug for providing pressure data indicative of the compression load applied by said electrode on a workpiece in contact with said end face during a resistance weld operation.

7. The instrumented electrode of claim 5 wherein said sensing means further comprises a piezoresistive device in pressure bearing relationship with said second surface of said plug for providing pressure data indicative of the compression load applied by said electrode on a workpiece in contact with said end face during a resistance weld operation.

8. The instrumented electrode of claim 5 wherein said sensing means further comprises a Hall effect device in said channel for providing magnetic field strength indicative of the current flow through said electrode during a resistance welding operation, said Hall effect device being mounted on an axis displaced from the central longitudinal axis of the electrode.

* * * * *